United States Patent
Taylor, Jr.

(10) Patent No.: US 8,876,282 B2
(45) Date of Patent: Nov. 4, 2014

(54) EYEWEAR SYSTEM

(71) Applicant: Jeffrey A. Taylor, Jr., Highland, MD (US)

(72) Inventor: Jeffrey A. Taylor, Jr., Highland, MD (US)

( * ) Notice: Subject to any disclaimer, the term of this patent is extended or adjusted under 35 U.S.C. 154(b) by 0 days.

(21) Appl. No.: 13/886,380

(22) Filed: May 3, 2013

(65) Prior Publication Data

US 2013/0308086 A1 Nov. 21, 2013

Related U.S. Application Data

(60) Provisional application No. 61/688,180, filed on May 9, 2012.

(51) Int. Cl.
*G02C 1/02* (2006.01)
*G02C 9/04* (2006.01)
*G02C 5/04* (2006.01)
*G02C 5/12* (2006.01)

(52) U.S. Cl.
CPC *G02C 9/04* (2013.01); *G02C 1/023* (2013.01); *G02C 5/045* (2013.01); *G02C 5/128* (2013.01); *G02C 5/126* (2013.01)
USPC ............................. 351/110; 351/47; 351/124

(58) Field of Classification Search
CPC ............ G02C 9/04; G02C 1/023; G02C 5/02; G02C 5/2209
USPC ............ 351/110, 124, 47, 57, 48, 58, 41, 158
See application file for complete search history.

(56) References Cited

U.S. PATENT DOCUMENTS

| | | | |
|---|---|---|---|
| 667,997 A | 2/1901 | Schweizer | |
| 1,167,953 A | 1/1916 | Uhlemann | |
| 1,586,110 A | 5/1926 | Newhouse | |
| 1,622,724 A | 3/1927 | Kirk et al. | |
| 1,636,339 A | 7/1927 | Welsh | |
| 1,897,833 A | 2/1933 | Benway | |
| 2,380,638 A | 7/1945 | D'urbano | |
| 3,395,964 A | 8/1968 | Neider | |
| 3,476,466 A | 11/1969 | Hopkins | |
| 3,533,687 A | 10/1970 | Herzig | |
| 4,029,403 A | 6/1977 | Harris | |
| 4,402,577 A | 9/1983 | Minard | |
| 4,542,965 A * | 9/1985 | Shedrow | 351/57 |
| 4,884,349 A | 12/1989 | Bataille | |
| 5,015,087 A | 5/1991 | Baratelli | |
| 5,477,281 A * | 12/1995 | Boyer | 351/128 |

(Continued)

*Primary Examiner* — Hung Dang
(74) *Attorney, Agent, or Firm* — Ober, Kaler, Grimes & Shriver; Royal W. Craig; Christopher F. Lonegro (57) ABSTRACT

An eyewear system for supporting one or more lenses on the face. Each lens is supported by receipt between a pair of suction cups on opposing prongs extending from an arm having a ball-end, the ball end received within a socket/cavity in a bridge piece engaged to the nose. The cavities may be formed with multiple apertures to opposing surfaces such that the arm can be rotated about the ball so as to permit the lens to be moved out of the line of site of the wearer. Multiple lenses may be supported in series within the prongs of a lens clip, in which case a double-sided suction cup is positioned between them to properly secure and space them. Removable temple pieces are optionally provided to support the lens over the ear, the temple pieces being engaged to the outside edges of the lens(es) with suction cup enabled lens clips as at the bridge piece.

14 Claims, 6 Drawing Sheets

(56) References Cited

U.S. PATENT DOCUMENTS

| | | |
|---|---|---|
| 6,059,409 A | 5/2000 | Sheldon |
| 6,086,199 A | 7/2000 | Holland |
| RE37,523 E | 1/2002 | Bondet |
| 6,969,172 B2 | 11/2005 | Actis-Datta |
| 7,513,617 B1 | 4/2009 | Alford |
| 7,559,646 B2 | 7/2009 | Kwan |
| 7,931,365 B2 | 4/2011 | Feng |
| 7,967,431 B2 * | 6/2011 | Siu ............................. 351/110 |
| 2008/0165318 A1 | 7/2008 | Oskarsson |

* cited by examiner

EYEWEAR SYSTEM

CROSS-REFERENCE TO RELATED APPLICATION

This application claims the benefit under 35 U.S.C. §119(e) of U.S. Provisional Patent Application Ser. No. 61/688,180 filed May 9, 2012, which is incorporated herein by reference.

BACKGROUND OF THE INVENTION

1. Field of the Invention

The present invention relates to eyeglass frame systems and more particularly of an interchangeable and reconfigurable system for supporting lenses on the face of a wearer.

2. Description of the Background

Eyeglasses have long been used to correct the vision of the wearer and provide protection to the eye from physical intrusion (safety glasses) and uncomfortable or damaging optical conditions (sunglasses). Modern eyeglasses typically use a frame to support a lens in front of each eye of the wearer and, in addition to the lenses, include a bridge piece joining the lenses at the wearer's nose and an arm extending from the lens at the wearer's temple back to and over the ear of the wearer. Historical types of glasses include the pince-nez and monocle designs which dispense with some aspects of the modern frame and are still worn by some. The lenses themselves may serve as a structural element joining the bridge piece and the arms or an additional frame element may serve this purpose. In either case the lenses are most commonly glass or plastic elements shaped or coated to serve their corrective or protective purposes and affixed permanently to or within the frame elements.

Because many corrective eyeglass wearers rely heavily on their glasses in order to be able to function in their daily lives wearers are rarely seen without them on their faces and the aesthetics of the eyewear have become an important aspect. There is a large market for eyewear fashions for both corrective and protective (i.e., sunglass) frames and many wearers have multiple styles of both to accommodate different situations. Frames and lenses are also not inexpensive and this coupled with a wearer's desire to be able to select an appropriate style of frame and lens for a given situation, leads many to purchase multiple pairs of eyeglasses, many of which see limited use. An eyewear system that quickly, easily and inexpensively permits the user to interchange both new and existing lenses with frame elements to achieve any functional and aesthetic lens/frame combination would be desirable.

SUMMARY OF THE INVENTION

It is, therefore, an object of the present invention to provide an eyeglass frame system that will readily and interchangeably accommodate any new or existing set of lenses.

It is another object of the present invention to provide an eyeglass frame system that includes elements that are themselves readily interchangeable with like elements of various color, material and/or finish to achieve a desired aesthetic look alone or in coordination with other clothing and accessories of the wearer.

It is yet another object of the present invention to provide an eyeglass frame system that is readily adjustable to accommodate the range shapes and sizes of human faces.

And it is further an object of the present invention to provide an eyeglass frame system that will readily and interchangeably accommodate conversion between a modern frame configuration and historical styles, and that will readily accommodate the addition of accessory items to accommodate certain use conditions as the wearer may desire.

According to the present invention, the above-described and other objects are accomplished, by an eyewear system for supporting one or more lenses on the face of a wearer. Where one lens is supported in front of each eye, each lens is supported by a lens clip comprising a pair of opposing prongs extending from a ball end on an arm with the lens received between the prongs and secured there by opposing suction cups affixed to the inside surfaces of the prongs. A bridge piece is provided with pads for engaging opposite sides of the nose of the wearer and to support the lens clips, the ball-ends of which are received by snap/friction within cavities formed in the surface of the bridge piece. The cavities are preferably formed with multiple apertures to opposing surface of the bridge piece in which the arm can be received so as to permit rotation of the lens about the ball-end thereby permitting the lens to be moved out of the line of site of the wearer. In certain embodiments where multiple lenses are positioned in series within the prongs of a lens clip, a double-sided suction cup is used to properly secure and space them. In further embodiments removable temple pieces will optionally be provided to support the lens over the ear of the wearer. The temple portions are engaged to the outside edges of the lens(es) with lens clips as at the bridge piece. A fabric mask may be provided to convert the lens system from the pince nez (i.e., sans temple pieces) to a goggle configuration.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
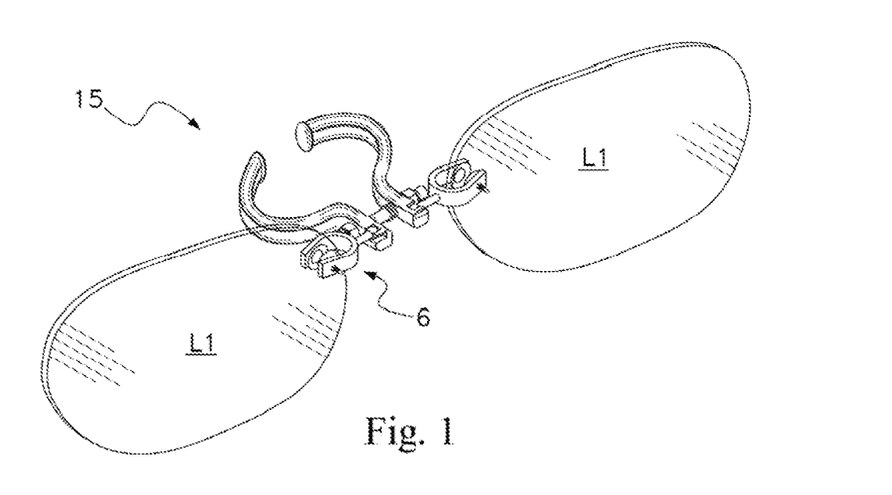
FIG. 1 is a perspective view of an eyeglass according to the present invention in pince-nez configuration.
Figure 2:
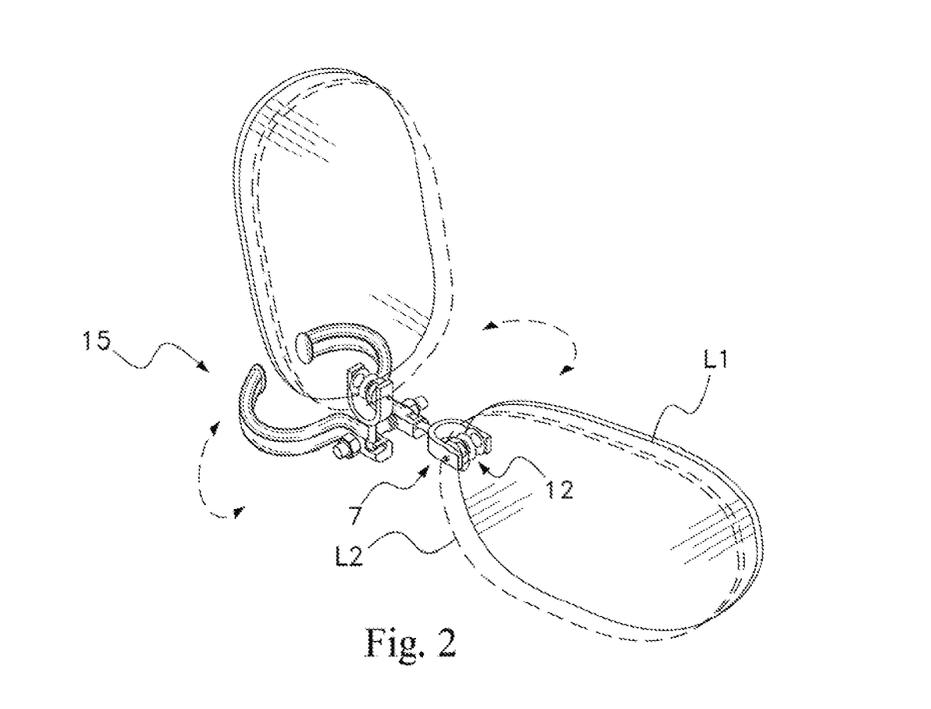
FIG. 2 is a perspective view of an eyeglass according to the present invention in pince-nez configuration in which the frame is articulated.
Figure 3:
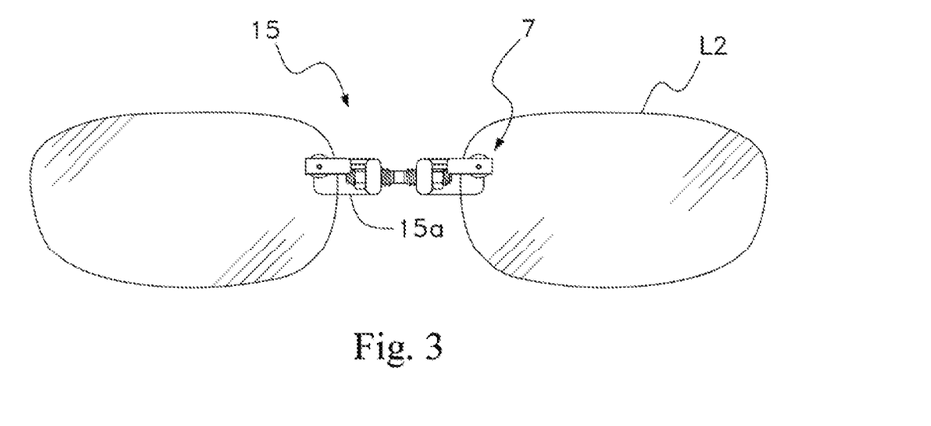
FIG. 3 is a front view of an eyeglass according to the present invention pince-nez configuration.

The invention is an eyewear system that can interchangeably accommodate any new or previously existing eyeglass lenses in any of a variety of frame styles including traditional full frame, pince-nez, monocle and goggle configurations. With reference to FIGS. 1, 2 and 3, the invention includes a frame assembly having a bridge piece 15 for securing to the bridge of the nose of the wearer and one or more lens clips 6 for engaging one or more lenses L1. Two lens clips 6 are preferred for balanced and secure operation but a single lens clip 6 is appropriate and functionally sufficient where a monocle configuration (i.e., single lens) is desired.

Figure 15:
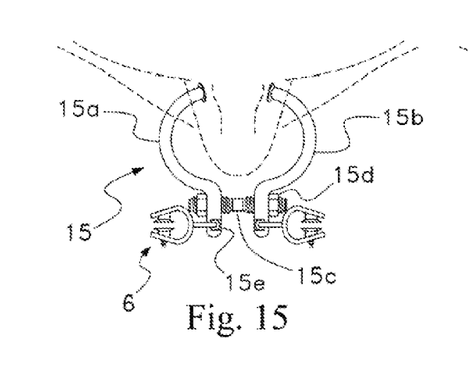
FIG. 15 is a top detail view of a bridge assembly according to the present invention.

With reference to FIG. 15, the bridge piece 15 may preferably be constructed of opposing left and right arcuate frame members 15a, 15b adjustably joined across the nose bridge by a threaded member 15c. The frame members 15a, 15b are preferably each provided at one end with nose guard portion for contacting the bridge of the nose. The nose guard my further be provided with a nose pad of cork, silicon or other suitable material for a soft, non-slip, and hypo-allergenic skin contact surface. The opposing end of each frame member 15a, 15b in this embodiment is provided with a hole through which the threaded member 15c is inserted. The threaded member 15c is provided with separate threaded portions on either end and the holes through the frame member may themselves be cooperatively threaded so as to engage the threaded member 15c or a separate, threaded nut may be provided. Rotation of the threaded member 15c causes the distance between the ends of the opposing frame members 15a, 15b to be adjusted to accommodate the shape and size of the bridge of the wearer's nose. Locking nuts 15d may further be provided to secure the position of the frame members 15a, 15b once adjusted to the desired position by counter-rotating the nuts 15d against the frame members 15a, 15b.

Figure 16:
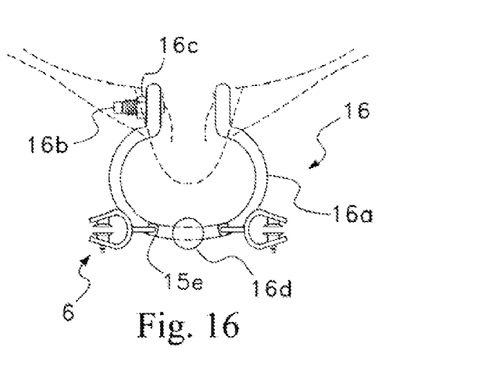
FIG. 16 is a top detail view of an alternate bridge assembly according to the present invention.

With reference to FIG. 16, an alternate embodiment of the bridge piece 16 is depicted in which a single arcuate frame member 16a is provided. The frame member ends at a first end in a static nose guard portion for contacting the bridge of the nose on one side. The opposing end of the bridge price 16 is further provided with a threaded member 16b adjustably positioned with a hole through the frame member 15a and having a second nose guard portion for engagement with the opposing side of the wearer's nose. Each nose guard my further be provided with a nose pad of cork, silicon or other suitable material for a soft, non-slip, and hypo-allergenic skin contact surface as in the previous embodiment. Likewise, a locking nut 16c may be provided to secure the threaded member in place once adjusted to the wearer's liking. A jewel, decal, emblem, image or other symbol may be mounted to the frame member 16a at position 16d for aesthetic or commercial purposes in this embodiment.

Figure 17:
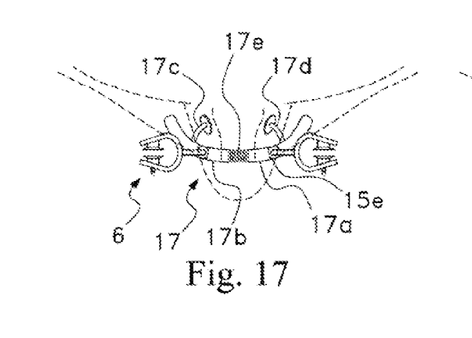
FIG. 17 is a top detail view of an alternate bridge assembly according to the present invention.

With reference to FIG. 17, an alternate bridge piece 17 is provided having opposing left and right frame members 17a, 17b joined, across the bridge of the wearer's nose with a spring elements 17c. The spring element 17e may be a flat, torsion or tension (extension) spring serving to compress the two frame members 17a, 17b to the bridge of the wearer's nose and may further be an integrally formed part of a unitary bridge piece 17 or may be separately formed and joined to the frame members 17a, 17b by known manufacturing methods. A nose guard portion for contacting the bridge of the nose is provided with or without a nose pad at the distal ends of stalks 17c, 17d extend out from beneath the frame members to engage the nose and support the bridge piece 17.

Figure 18:
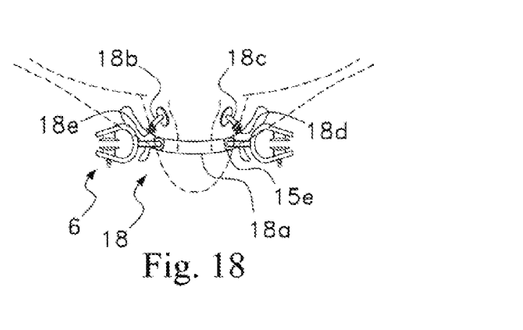
FIG. 18 is a top detail view of an alternate bridge assembly according to the present invention.

With reference to FIG. 18, a further alternate bridge piece 18 is provided having an single arcuate frame member 18a with opposing nose guard portions for contacting the bridge of the nose at the distal ends of stalks 18b, 18c extending out from beneath the frame member to engage the nose. The stalks 18b, 18c are each pivotably engaged to the frame member 18a by springs 18e, 18d, the springs being configured to bias the nose guards against the surface of bridge of the wearer's nose. The springs 18e, 18d may be flat, torsion or compression springs. A lever (not shown) may be provided opposite each pivot point to counter the spring bias in order to place the bridge piece 18 in position on the nose.

Figure 19:
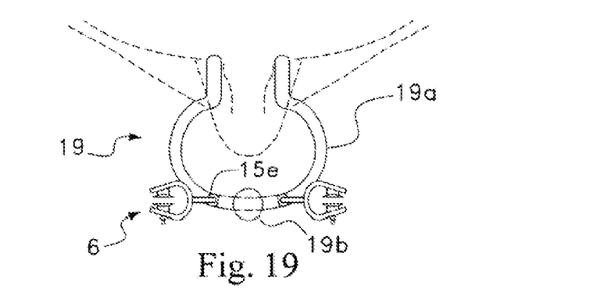
FIG. 19 is a top detail view of an alternate bridge assembly according to the present invention.

With reference to FIG. 19, as previously described with respect to the embodiment of FIG. 17, a bridge piece 19 is provided that uses the natural spring tension of the frame member 19 to compress the bridge piece 19 onto the bridge of the nose of the wearer. A jewel, decal, emblem, image or other symbol may again be mounted onto the frame in reference character 19b.

With combined reference to FIGS. 1, 5 and 15-19, each of the disclosed bridge pieces 15, 16, 17, 18 and 19 are provided with one or more cavities 15e formed within the frame member or members of the bridge piece on one or both sides of the nose bridge. Where more than one cavity 15e is provided, the cavities 15e are preferably positioned symmetrically on either side of the bridge. Cavities 15e are voids formed within the frame elements from one or more surfaces sized and shaped for cooperative insertion of a ball element 6a (see FIG. 6) of a lens clip 6 as will be described. The ball element may preferably be spherical in nature and sized for a secure friction fit within the cooperatively sized and shaped cavity 15e forming a ball-and-socket engagement. Friction within the joint serves to deter motion of the lens clip once positioned by the wearer. In certain embodiments the ball element 6a may be other than spherical, such as for example cylindrical or elliptical in shape, so as to favor or eliminate motion of the ball within the cavity in one direction as compared to another.

In a preferred embodiment the cavity 15e is formed within the frame element from a single surface such that rotation of the ball within the socket (and thus movement of the lens clip itself) is ultimately limited by contact between the clip arm 6b and the edge of the cavity aperture. With reference to FIG. 1, an alternate embodiment of the cavity 15*e* is depicted in which the cavity is open to more than one surface of the frame member 15*a*. The cavities depicted in FIG. 1 are open three surfaces (top, front and side) such that extended rotation of the ball 6*a* within the socket 15*e* is permitted in the favored directions as depicted in FIG. 2. As can be seen in FIG. 2, extended rotation of the lenses L1 is permitted by the disclosed socket 15*e* such that the lens L1 can be selectively rotated upward (about a horizontal axis) and outward (about a vertical access) to remove them from the wearer's line of sight while leaving the position of the frame and opposite lens, if any, unchanged.

Figure 4:
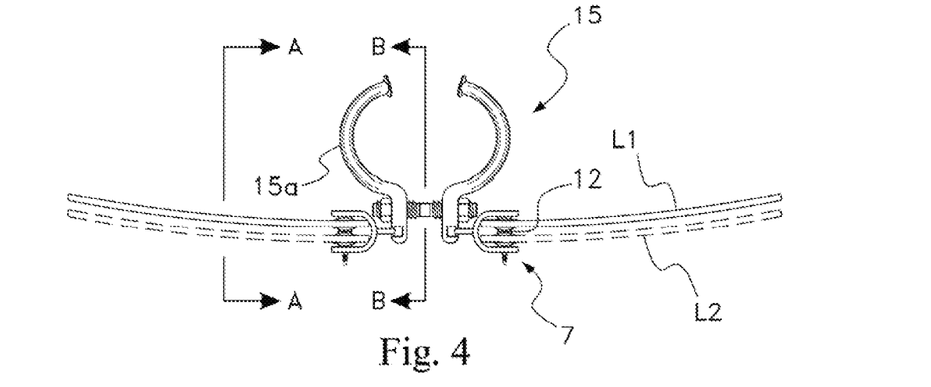
FIG. 4 is a top view of an eyeglass according to the present invention pince-nez configuration.
Figure 4A:
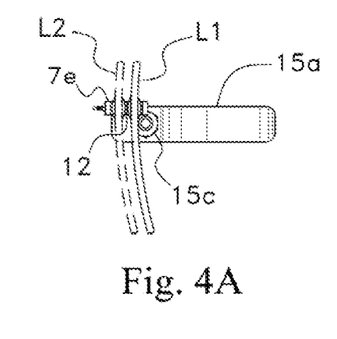
FIG. 4A is section view of an eyeglass according to the present invention cut at line AA of FIG. 4.
Figure 4B:
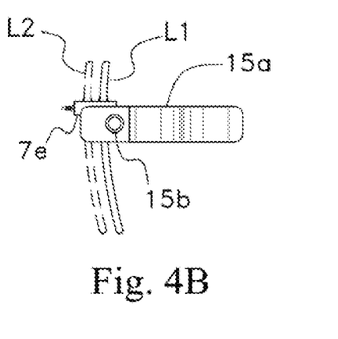
FIG. 4B is a section view of an eyeglass according to the present invention cut at line BB of FIG. 4.
Figures 5, 6, 7, 8:
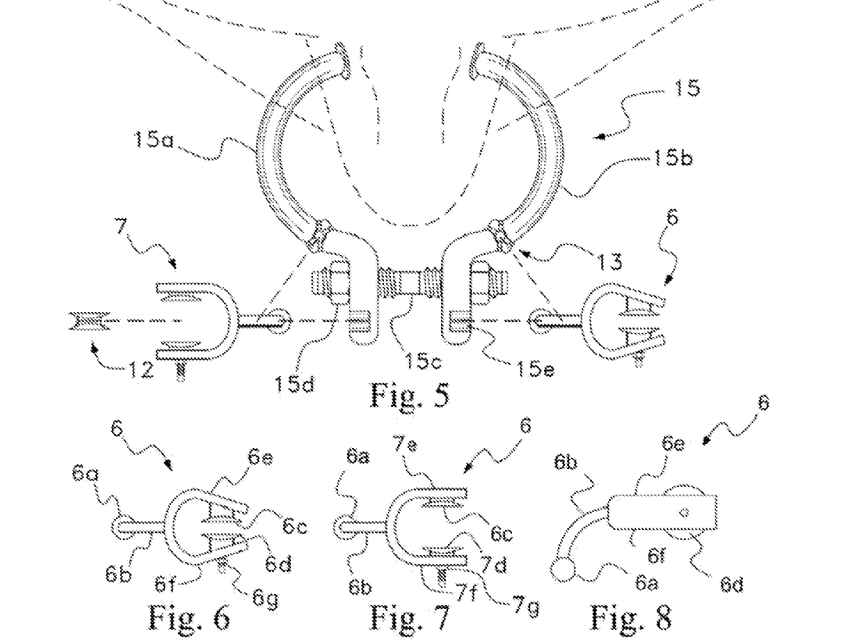
FIG. 5 is an exploded top detail view of a bridge piece according to the present invention.
FIG. 6 is a top detail view of a lens clip according to the present invention.
FIG. 7 is a top detail view of an alternate lens clip according to the present invention.
FIG. 8 is a side detail view of the lens clip of FIG. 6 or FIG. 7.

With general reference to FIGS. 5-11 and specific reference to FIGS. 6-8, a lens clip 6 is provided by which to support one or more lenses (L1, L2—see FIGS. 2, 4) in the bridge piece. The lens clip 6 includes a ball element 6*a* at the distal end of a clip arm 6*b*, 9*b*, the ball element being received by snap-fit within the cavity 15*e*, as described above. The clip arm may be arcuate as depicted in FIG. 8 (6*b*) or may be straight as depicted in the alternate lens clip of FIGS. 9-11 (9*b*). The clip arm 6*b*, 9*b* extends from the ball element 6*a* to join the opposing prongs 6*e*, 6*f* 7*e*, 7*f* of the clip. The prongs 6*e*, 6*f* form a U-shaped element sized to receive an edge of a lens L1 the lens is inserted between them, and are preferably formed of a strong and resilient material so as to have some give in their shape. Affixed to prone 6*e* is a first suction cup 6*c*. Adjustably affixed to the opposing prong 6*f* is a second suction cup 6*d* cooperatively positioned to affix-to, secure and stabilization an ophthalmic or other lens L1 when it between the prongs. In some embodiments a threaded element 6*g* may be provided between the cup 6*d* and the prong 6*g* by which to adjust the distance between the cups 6*c*, 6*d* to accommodate lenses L1 of various thicknesses.

Figure 9:
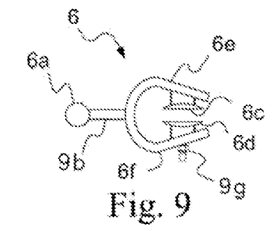
FIG. 9 is a top detail view of an alternate lens clip according to the present invention.
Figure 10:
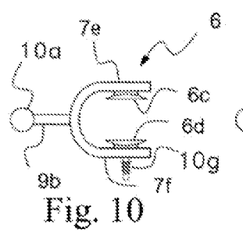
FIG. 10 is a top detail view of an alternate lens clip according to the present invention.
Figure 11:
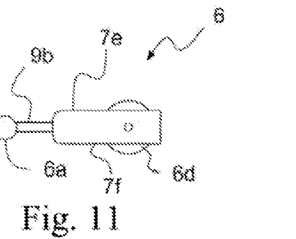
FIG. 11 is a side detail view of the lens clip of FIG. 9 or FIG. 10.

With reference to FIGS. 7 and 10, alternate embodiments of a lens clips of FIGS. 6 and 9, respectively, are depicted in which the prongs 7*e*, 7*f* are spread further apart to accommodate multiple (generally two) lenses L1, L2 in series as best seen in FIGS. 2 and 4. As seen in FIG. 4, when a multi-lens lens clip 7, 10 is used a cooperative dual suction cup 12 (See FIG. 5 (inset—left) and 12) is sandwiched between the two ophthalmic lenses (e.g., corrective and sunglasses/tinted) to space and align the lenses and support them within the lens clip 6. As with suction cups 6*c*, 6*d*, the dual suction cup 12 is constructed of a resilient, non-permeable material and uses negative relative air pressure to secure the cup to the surface(s) of the lens(es).

Figure 20:
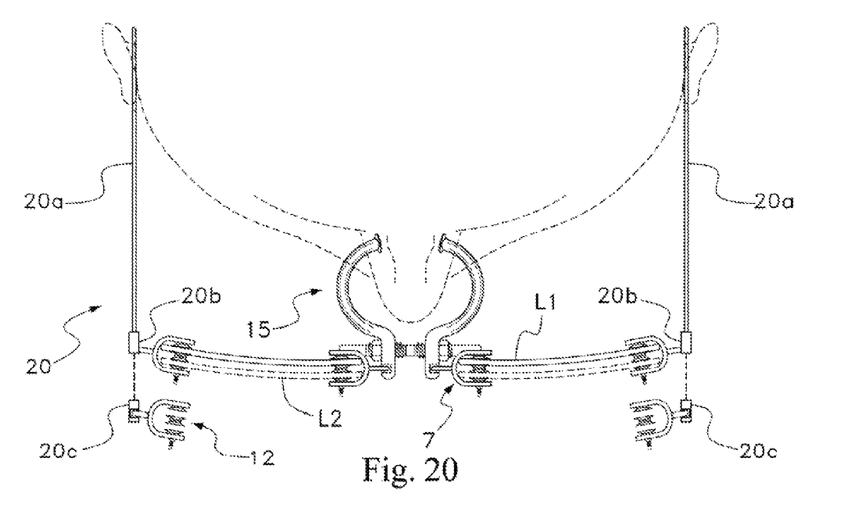
FIG. 20 is a top partially exploded view of an eyeglass according to the present invention with temple arms.
Figure 21:
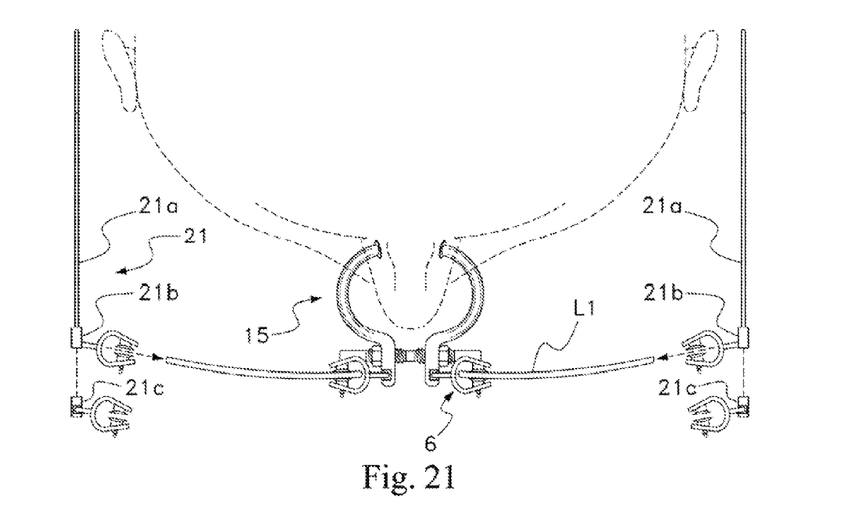
FIG. 21 is a top partially exploded view of an alternate eyeglass according to the present invention with temple arms.

With reference to FIG. 1, a frame assembly 1 including the bridge piece 15, lens clips 6, suction cups 12 and lenses L1 can be worn in this pince-nez configuration. With additional reference to FIGS. 20 and 21, the wearer may further, at his or her discretion, include additional temple pieces 20, 21 to support the lenses on their face. The temple pieces 20, 21 incorporate a linear earpiece 20*a*, 21*a* extending from the wearer's temple back to and over the ear of the wearer in the manner of a modern eyeglass frame. The earpiece 20, 21 may be of bendable wire, plastic or metal as is known to those skilled in the art. Each earpiece 20, 21 is provided with a lens clip that is fixed 20*b*, 21*b* or detachable 20*c*, 21*c* atom the earpiece 20*a*, 21*a* for securing, the earpiece to the edges of the lenses L1, L2 at the outside edge of the wearer's face. Lens clips 20*b*, 20*c* accommodate two lenses stacked in series as with the bridge piece lens clip depicted in FIGS. 7, 10 and described above and utilizes a dual suction cup 12 between the lenses L1, L2 to secure and stabilize the lenses within the clips. Lens clips 21*b*, 21*c* accommodate a singe lens as with the bridge piece lens clip 6 described above. Temple lens clips 20*c*, 21*c*, being removable from the earpieces 20*a*, 21*a*, can accommodate various designs and styles of earpieces as the wearer desires. The lens clips 20*c*, 21*e* may also be secured to the lens(es) and worn without the earpiece 20*a*, 21*a* as a handle or grip for adjusting the position of the frame assembly without the need to touch the lens. The inclusion of the temple earpieces with the variety of pince-nez frames described above transforms any of the pince-nez frames into a modified, modern eyeglasses frame with earpieces.

Figure 22A:
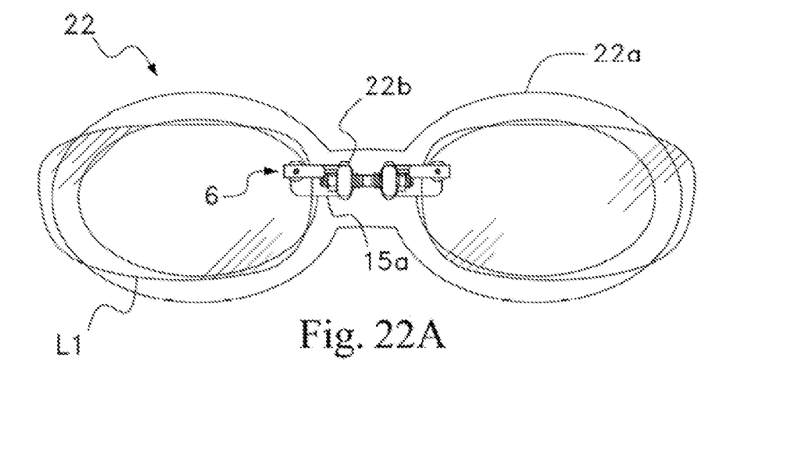
FIG. 22A is a front view of an eyeglass according to the present invention with optional mask element.
Figure 22B:
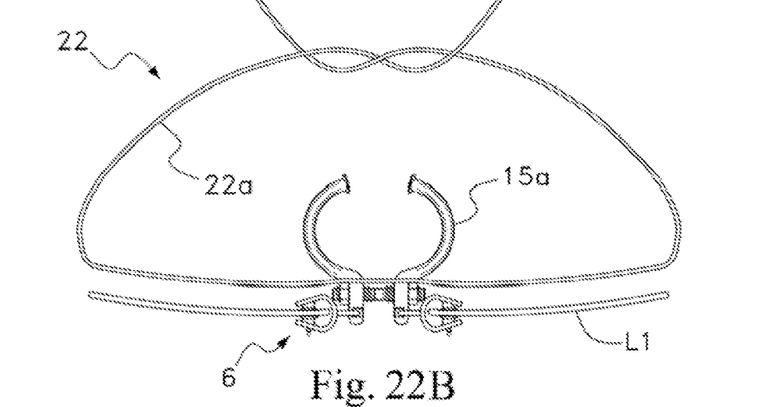
FIG. 22B is a top view of an eyeglass according to the present invention with optional mask element.

With reference to FIGS. 22A and 22B, a further embodiment of the present invention is depicted in which the pince-nez configuration of the present invention previously described is combined with a flexible, typically fabric mask element 22*a* to produce a goggle configuration. The mask element 22*a* can be any suitable fabric material to be secured about the head of the wearer having openings for cooperative alignment with the eyes of the wearer. The fabric mask element may extend around the head to be secured as by tying, snaps, or hook and loop fasteners, for example, or may be composed of multiple elements such as, for example, an elastic band extending behind the head of the wearer and affixed on either side to a mask portion extending across the face of the wearer. The mask portion has a bridge element 22*b* covering the bridge of the nose of the wearer. The mask bridge element 22*b* is further provided with holes through which the frame members 15*a*, 15*b* (see FIG. 22B) are inserted prior to the wearer donning the mask. The fabric mask element 22*a* engages and secures the frame members 15*a* (and thus the frame assembly 1) to the face of the wearer. In certain embodiments the fabric mask element may further include one or more surface features such as a ridge or protrusions around all or a portion of the eye at the edge of the lenses, acting cooperatively with the lenses to limit or eliminate airflow to the eye behind the lens.

Figure 23:
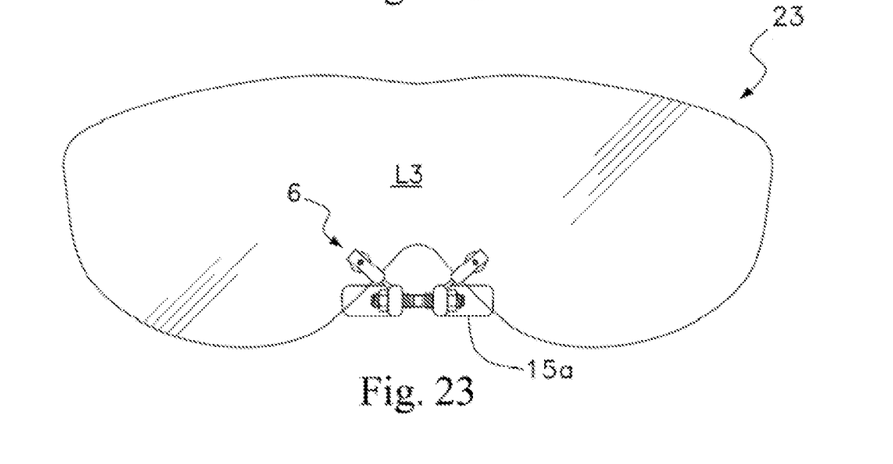
FIG. 23 is a front view of an eyeglass according to the present invention with one-piece/oversized lens.

With reference to FIG. 23, the frame assembly of the present invention can further accommodate a single, oversized lens L3 as opposed to the conventional, individual lens pairs L1 or L2.

Figures 12, 13A:
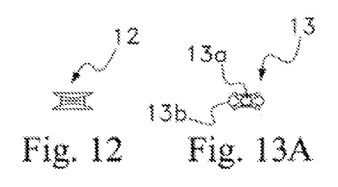
FIG. 12 is a top detail view of a spacer element according to the present invention.
FIG. 13A and FIG. 13B are top and side detail views, respectively, of an external cavity according to the present invention.
Figure 13B:
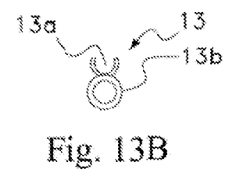
Figure 14:
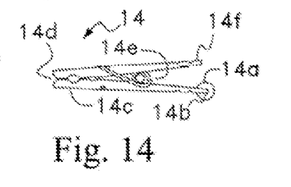
FIG. 14 is a detail view of an alternate lens clip according to the present invention.

With reference to FIGS. 13A and 13B, an external "cavity" 13 is depicted for use with any of the previously described embodiment of the bridge piece of the frame assembly 1. The external cavity 13 includes band portion 13*b* that can be affixed to the frame members 15*a*, 15*b* as can be seen in FIG. 5. The band portion 13*b* is secured to the frame members by friction fit and is attached to a cavity portion 13*a* that is sized and shaped to receive by snap fit the ball element 6*a* of a lens clip 6. The external cavity 13 serves as an alternate means of securing the lens clip 6 to the frame members 15*a*, 15*b* in place of the cavity 15*e*. The cavity portion 13*a* may be shaped to provide greater or lesser restriction on the adjustability of the position of the lens clip 6 than is provided by the cavity 15*e* at the discretion and selection of the wearer.

The present invention has advantages over all monocles; pince-nez glasses, conventional eye glasses and goggles because it permits a single set of existing or new lenses to be transformed into each of these types of eye wear frames. The user of the invention can incorporate and accommodate corrective-prescription eyeglasses and/or sunglasses into any combination of conventional glasses, pince-nez glasses, goggles or a monocle and back again in minutes by changing only a few small parts and without the need for tools. In addition to changing the operative form of the frame, the user can likewise change the color, finish and style of various parts of the frame assembly and lens(es) at will and without tools.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. An eyewear system for supporting a plurality of lenses on the face of a wearer, comprising
 a plurality of lens clips, each said lens clip comprising a ball-end affixed to a first end of an arm, said arm affixed at another end to a pair of opposing prongs between which an edge of one of said plurality of lenses is received, said lens clip further comprising a suction cup affixed to each said prongs for securing said lens therebetween; and
 a bridge piece for engaging opposite sides of the nose of said wearer and a plurality of cavities within said bridge piece, said plurality of cavities cooperatively formed to removably receive one of said ball-ends of said plurality of lens clips by snap fit.

2. The eyewear system of claim 1 further comprising a plurality of lenses wherein at least one of said plurality of lenses is secured in each of said plurality of lens clips.

3. The eyewear system of claim 2 wherein said plurality of lenses is a pair of lenses, one lens of said pair of lenses secured within said lens clip.

4. The eyewear system of claim 2 wherein said plurality of lenses comprises two pairs of lenses, two of said lenses secured between the suction cups of each of said plurality of lens clips, said eyewear system further comprising a plurality of double-sided suction cups wherein one of said plurality of double-sided suction cups is positioned between the lenses each said pair of lenses.

5. The eyewear system of claim 2 further comprising a plurality of temple pieces, said temple pieces each comprising an earpiece for engagement at a first end with an ear of said wearer and a lens clip at an opposite end for engagement with one of said plurality of lenses.

6. The eyewear system of claim 2 wherein each of said plurality of cavities comprises a first aperture open to a first surface of said bridge portion and a second aperture open to a second surface of said bridge portion whereby said arm of said lens clip is permitted to selectively move from said first aperture to said second aperture by rotation about said ball-end such that said lens in said lens clip is pivoted out of the line-of-sight of a wearer about a first axis.

7. The eyewear system of claim 6 wherein each of said plurality of cavities further comprises a third aperture open to a third surface of said bridge portion whereby said arm of said lens clip is permitted to selectively move from said first aperture to said third aperture by rotation about said ball-end such that said lens in said lens clip is pivoted out of the line-of-sight of a wearer about a second axis.

8. The eyewear system of claim 1 wherein said bridge piece further comprises a pair of opposing frame member and a threaded element, each of said frame members engaged to said threaded element so as to be adjustably spaced from one another.

9. The eyewear system of claim 1 wherein said bridge piece further comprises a pair of opposing frame member, said opposing frame members joined by a spring element so as to be biased to engaged said opposite sides of the nose of said wearer.

10. The eyewear system of claim 1 wherein said bridge piece comprises a resilient member so as to be biased to engaged said opposite sides of the nose of said wearer.

11. The eyewear system of claim 10 wherein said resilient member is a spring.

12. The eyewear system of claim 1 wherein said bridge piece comprises a pair of nose pads, each of said nose pads extending from said bridge piece on a stalk for engagement with opposite sides of the nose of said wearer, each of said stalks engaged to said bridge piece by a spring element.

13. The eyewear system of claim 1 wherein said bridge piece comprises a pair of nose pads, each of said nose pads extending from said bridge piece on a stalk for engagement with opposite sides of the nose of said wearer, each of said stalks engaged to said bridge piece by a spring element.

14. The eyewear system of claim 1 further comprising a fabric mask element for securing about the head of said wearer, said mask element comprising a pair of apertures for cooperative alignment with the eyes of said wearer and a bridge portion between said apertures, said bridge portion further comprising at least one hole into which said bridge piece may be engaged whereby said bridge piece is secured to the bridge of the nose of said wearer when said mask element is secured about the head of said wearer.

* * * * *